(12) United States Patent
Klassen

(10) Patent No.: US 7,937,235 B2
(45) Date of Patent: *May 3, 2011

(54) SCANNER CALIBRATION ROBUST TO LAMP WARM-UP

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/535,870

(22) Filed: Aug. 5, 2009

(65) Prior Publication Data

US 2009/0287442 A1    Nov. 19, 2009

Related U.S. Application Data

(63) Continuation of application No. 11/845,969, filed on Aug. 28, 2007, now Pat. No. 7,590,501.

(51) Int. Cl.
*G01D 18/00* (2006.01)

(52) U.S. Cl. .......................................................... 702/85

(58) Field of Classification Search ..................... 702/85, 702/86; 358/406, 462, 504; 250/363.09
See application file for complete search history.

(56) References Cited

U.S. PATENT DOCUMENTS

| 5,404,232 | A | * | 4/1995 | Selby | 358/406 |
| 7,856,331 | B2 | * | 12/2010 | Thompson | 702/85 |
| 2002/0051234 | A1 | | 5/2002 | Rao et al. | |
| 2005/0185227 | A1 | * | 8/2005 | Thompson | 358/474 |
| 2007/0045548 | A1 | | 3/2007 | Kiser | |
| 2007/0103734 | A1 | | 5/2007 | Angal et al. | |

* cited by examiner

*Primary Examiner* — Bryan Bui
(74) *Attorney, Agent, or Firm* — Fay Sharpe LLP

(57) ABSTRACT

Systems and methods are described that facilitate calibrating a scanner by capturing a plurality of white calibration files and generating a mathematical function that models the scanner. For instance, a white calibration file can be captured before and after a page is scanned, and the function can be an average of offset and gain values for pixels in scanlines of the scanned page. Three or more white calibration files can be used to generate a linear function (e.g., using linear regression) or an exponential function describing the gain an offset values of the pixels.

19 Claims, 6 Drawing Sheets

SCANNER CALIBRATION ROBUST TO LAMP WARM-UP

CROSS-REFERENCE TO RELATED APPLICATIONS

This application is a continuation of, and hereby claims priority to, U.S. patent application Ser. No. 11/845,969, filed Aug. 28, 2007, now U.S. Pat. No. 7,590,501, entitled "SCANNER CALIBRATION ROBUST TO LAMP WARM-UP." That application is hereby fully incorporated by reference.

The following patents/applications, the disclosures of each being totally incorporated herein by reference are mentioned:

U.S. Pat. No. 7,206,532, Issued Apr. 17, 2007, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. 20031468-US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Publication No. US-2006-0222384-A1, Published Oct. 5, 2006, entitled "IMAGE ON PAPER REGISTRATION ALIGNMENT," by Steven R. Moore, et al.;

U.S. Pat. No. 7,245,856, Issued Jul. 17, 2007, entitled "SYSTEMS AND METHODS FOR REDUCING IMAGE REGISTRATION ERRORS," by Michael R. Furst, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0024894-A1, Published Feb. 1, 2007, entitled "PRINTING SYSTEM," by Steven R. Moore, et al.;

U.S. Application Publication No. US-2007-0052991-A1, Published Mar. 8, 2007, entitled "METHOD AND SYSTEMS FOR DETERMINING BANDING COMPENSATION PARAMETERS IN PRINTING SYSTEMS," by Goodman, et al.;

U.S. Publication No. US-2007-0110301-A1, published May 17, 2007, entitled "GAMUT SELECTION IN MULTI-ENGINE SYSTEMS," by Wencheng Wu, et al.;

U.S. Publication No. US-2007-0120305-A1, Published May 31, 2007, entitled "RADIAL MERGE MODULE FOR PRINTING SYSTEM," by Barry P. Mandel, et al.; and U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen.

BACKGROUND

The subject application relates to document scanning, and more particularly to calibrating a scanner in order to facilitate uniformity in scanned page contrast, brightness, etc. For instance, a scanner can be coupled to a printer or other xerographic device and calibrated to scan pages that pass through the scanner.

Conventional scanner systems employ calibration techniques to attempt to ensure that constant black and constant white scanned images have constant values across multiple pages. The lamp on a scanner typically changes during a warm-up period, which may run minutes to tens of minutes long. The difference in illumination can be on the order of 1.5%, and so in a typical scanning operation may be immaterial, particularly if the scanner is calibrated at the start of a sequence of scans.

Using a scanner as a surrogate for a spectrophotometer leads to much tighter requirements, which can be addressed by leaving the lamp on long enough for the illumination to stabilize. Another approach is to leave the lamp on at all times while a printer is operating. However, either of these approaches lead to additional issues with power consumption and lamp life.

Accordingly, there is an unmet need for systems and/or methods that facilitate overcoming the aforementioned deficiencies.

BRIEF DESCRIPTION

In accordance with various aspects described herein, systems and methods are described that facilitate calibrating a scanner using a plurality of captured white calibration files to generate a function that describes a mathematical model of the scanner and contains information related to pixel offset and gain in a scanned page. For example, a method for calibrating a scanner, comprises capturing a black calibration file, positioning a scan bar near a substantially uniform white calibration strip, capturing a first white calibration file while a scanner lamp is on; capturing a second white calibration file, and computing gain and offset values using the black calibration file, the first white calibration file and the second white calibration file. Capturing the black calibration file is done while the scanner lamp is off, or while the scan bar is positioned near a substantially non-reflective object. A second black calibration file can be captured after a page is scanned. The method can further comprise generating an average value from the first and second white calibration files and calibrating the scanner to the average white value. Additionally, the method may comprise performing a linear regression technique to generate a linear function that describes pixel gain and offset as a function of time, and applying the linear function to a scanline according to a time of capture of the scanline. According to another aspect, the method comprises capturing a third white calibration file, wherein the third and subsequent white calibration files are iteratively captured subsequent white calibration files after each of a plurality of pages is scanned, and generating an exponential decay function from at least three white calibration files, wherein the exponential decay function describes pixel gain and offset as a function of time. The exponential decay function can then be applied to a scanline according to a time of capture of the scanline.

According to another feature described herein, a scanner calibration system comprises a scanner with a lamp, a calibration strip, and a scan bar, and a calibration file capture component that captures a black calibration file, and captures white calibration files when the lamp is on. The system further comprises a gain and offset processor that computes gain and offset values using data from one or more captured white calibration files and the black calibration file, and a function generator that generates a function representing the gain and offset values, using the captured calibration files. The lack calibration file can be captured at least one of while the lamp is off or while the lamp is on and the scan bar is positioned near a substantially non-reflective object. Additionally, the calibration file capture component captures a first white calibration file when the lamp is turned on and warmed up, and wherein the scanner scans a page after the first white calibration file is captured. The calibration file capture component captures a second white calibration file after the scanner scans the page. The function representing pixel gain and offset information can be at least one of an average of values from the first and second white calibration files, or a linear function generated from the first and second white calibration files. Additionally or alternatively, the calibration file capture component captures at least a third white calibration file, and the function representing pixel gain and offset information is at least one of a linear function generated from the first, second, and third white calibration files using linear regression, or an exponential decay function generated from the first, second, and third white calibration files. The scanner applies the function to calibrate a scanned page.

Yet another feature relates to a printing platform, comprising a scanner with a lamp, a calibration strip, and a scan bar, wherein the scan bar is positioned proximate to the calibration strip for white calibration file capture, and a calibration file capture component that captures a black calibration file, and captures white calibration files when the lamp is on. The printing platform further comprises a gain and offset processor that analyzes information related to gain and offset for pixels in a scanline of a scanned page using data from one or more captured white calibration files, and a function generator that generates at least one of an average function, a linear function, or an exponential function representing gain and offset information for the pixels in the scanlines of the scanned page, using information in the captured white calibration files. The scanner can be coupled to an output of a printer system.

DETAILED DESCRIPTION

In accordance with various features described herein, systems and methods are described that facilitate calibrating black and white settings in a scanner. For example, in normal operation, a scanner is calibrated to black with a lamp therein turned off, and to white by illuminating a calibration strip, before each scan of a page. Alternatively, the scanner may be calibrated to black with the lamp turned on, but with the sensing portion directed to a non-reflective or non-illuminated region. The collection values sensed by the sensing elements of the scanner when the light from the lamp is not reflected to the sensing elements (either because the lamp is not on or because the light is directed elsewhere, such as toward a non-reflective object positioned near the lamp) is herein referred to as the black calibration file. The collection of values sensed by the sensors when the light is reflected from the calibration strip to the sensing elements is herein referred to as the white calibration file. A gain and offset are computed for each pixel based the data in the white calibration file and data in the black calibration file. According to one or more features, the scanner is calibrated to black as normal, and then calibrated to white multiple times, preferably before and after the scan of a page. The scanlines of a scanned page have associated scan times, which can be normalized such that t=0 is the time of the first calibration and t=1 is the time of the last calibration. A calibration model, or function, is built and describes gain and offset as a function of time. The function is then applied to each scanline according to its time of capture, to calibrate the scanner. Multiple black calibration files can be acquired as well, and included in the calculation of gain and offset, if the sensor dark response is expected to change.

Figure 1:
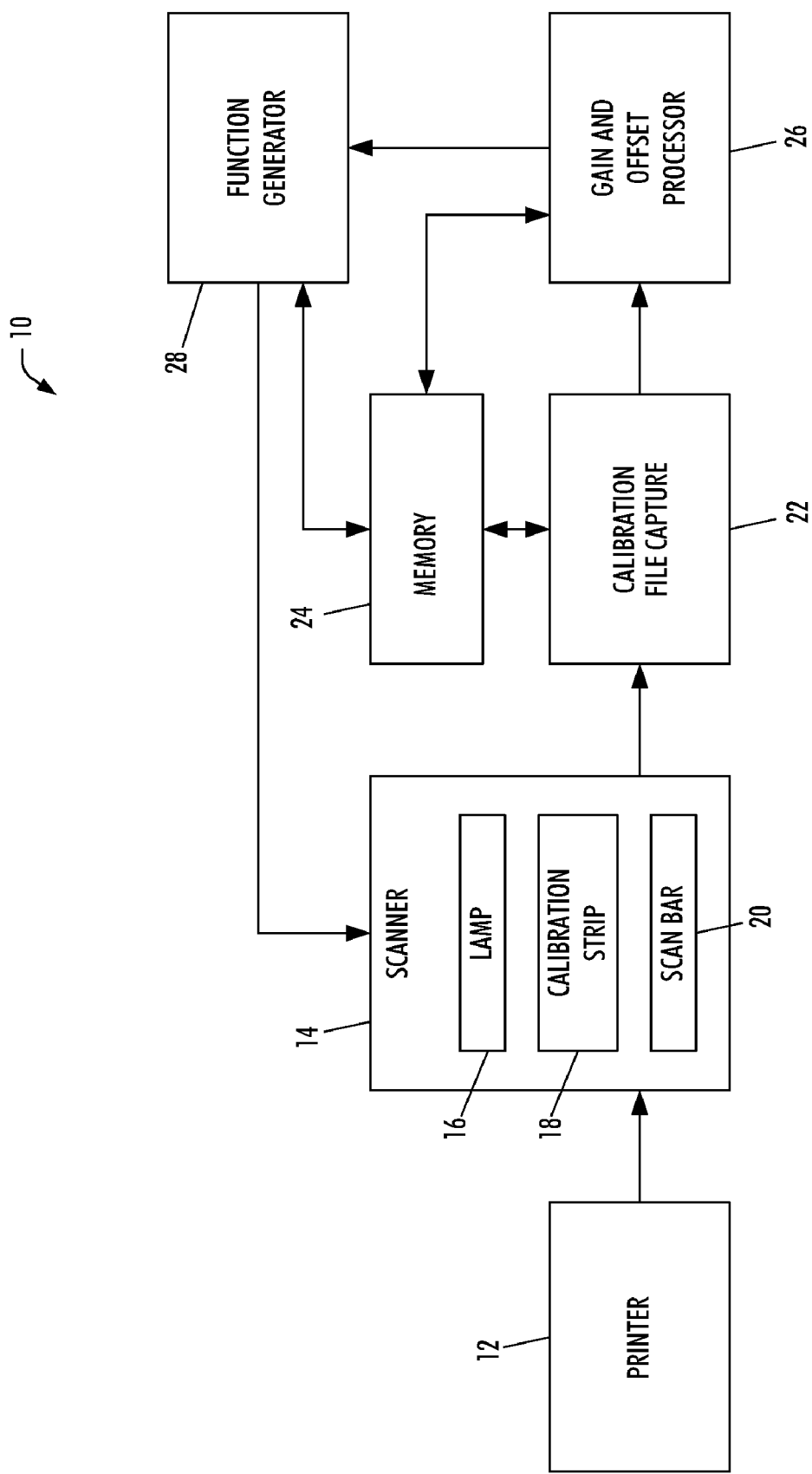
FIG. 1 illustrates a system that facilitates calibrating a scanner using multiple white calibration scan files to generate a calibration function that describes pixel gain and offset for pixels in a scanned page, and which is applied to scanlines in the page image based on the capture time of each scan.

With reference to FIG. 1, a system 10 is illustrated that facilitates calibrating a scanner using multiple white calibration scan files to generate a calibration function that describes pixel gain and offset for pixels in a scanned page, and which is applied to scanlines in the page image based on the capture time of each scan. The system 10 comprises a printer 12, such as a tightly-integrated parallel printing (TIPP) device or the like, and a scanner 14 coupled to the output thereof. The scanner 14 comprises a lamp 16, a substantially white calibration strip 18 that is illuminated when the lamp is turned on, and scan bar 20 that is placed near the calibration strip 18 when a white calibration file is to be captured. The scanner 14 additionally comprises scanning hardware and software, etc., as will be appreciated by those of skill in the art.

The system 10 further comprises a calibration file capture component 22 that captures calibration files at desired times. For instance, calibration file capture can be performed when the lamp is off, or when its light is not directed at a reflective surface within view of the sensor, in order to capture a black calibration file. Additionally or alternatively, calibration files can be captured while the lamp is on and illuminating the calibration strip, to capture white calibration files. Captured calibration file information can be stored to memory 24. Additionally such information is received by a processor 26 that generates gain and offset information for pixels in scanned image or page, whish is in turn employed by a function generator 28 to generate a calibration function. The calibration function is then applied to scanlines in a scanned page image to calibrate the scanner. It will be understood that the calibration file capture component 22, memory 24, processor 26, and/or function generator 28 can be integral to the scanner 14.

The scanner 14 can measure both non-uniformity (e.g., to apply uniformity corrections) and measure the colors being produced by, for instance, two printers (e.g., of a TIPP printer), which can be employed together inside one housing to present the appearance of a single machine with increased reliability and speed. Using a scanner as a measuring device can accentuate aspects of the scanner that are well within specifications for other applications. In particular, employing the scanner as a measuring device stresses the scanner's ability to produce a stable, consistent results at high precision given the same input, scanned multiple times.

Figure 2:
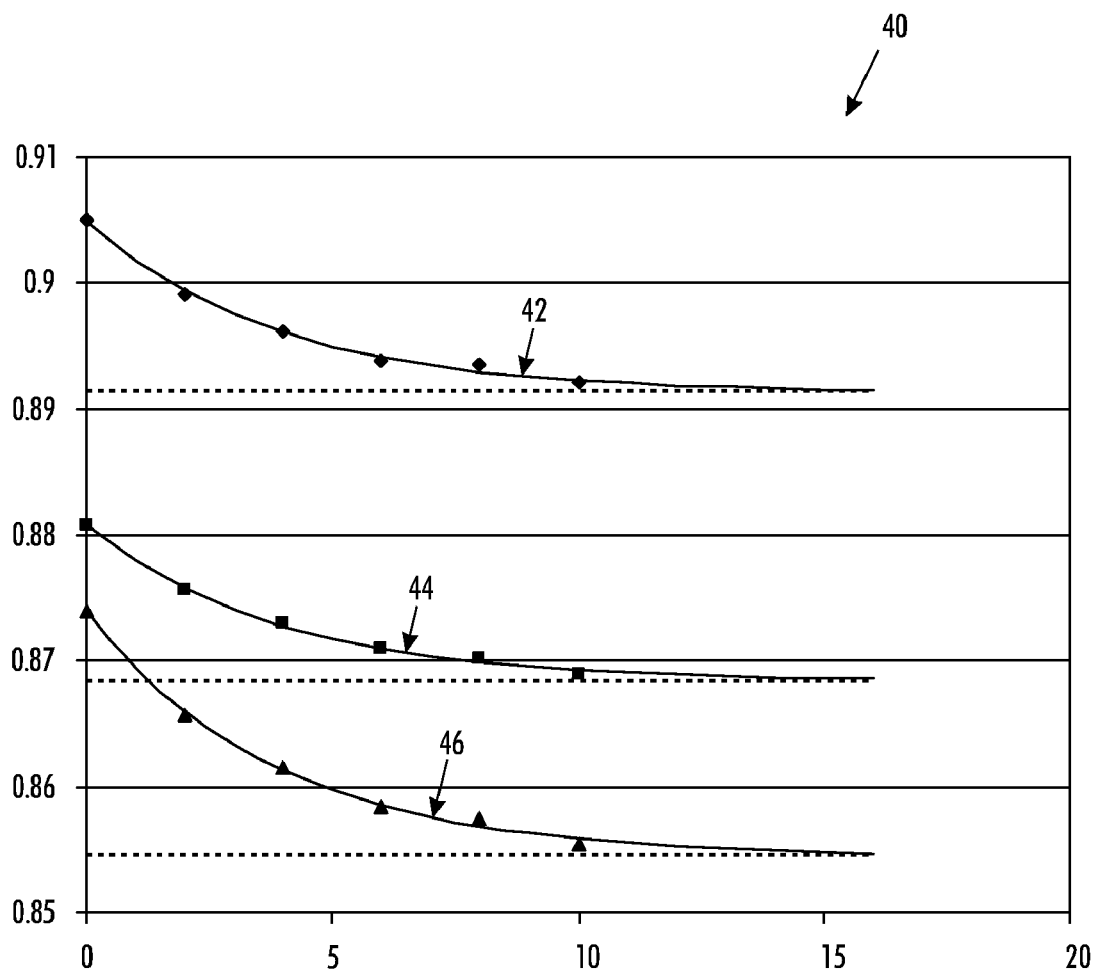
FIG. 2 illustrates an example of a graph of data representative of a calibrated scanner response across pixels in a scanned white page.

FIG. 2 illustrates an example of a graph 40 of data representative of a calibrated scanner response across pixels in a scanned white page. The graph 40 shows three fit lines, 42, 44, and 46, corresponding to red, green, and blue calibration responses across the pixels in the scanned page. The y-axis indicates time; in one example, the y-axis represents time in minutes. However, the duration of the upload of scan data is a function of the capture station employed to capture the scan and upload the data (e.g., to a processor or memory or the like).

To further this example, further detail of the calibration and scanning process is described below. Initially, the lamp can be left off overnight so that it is cold at the beginning of a scan calibration procedure. At the start of each scan, a black calibration file is captured, followed by a white calibration file, and then the image. The white calibration file is captured by positioning the scan bar beneath the nearly uniform white calibration strip (with the lamp on); the black calibration file is captured with the lamp off.

The black and white calibration files are used to compute a gain and offset per pixel, which are applied to the scan data to obtain a calibrated scan. If the lamp is less bright at the time of the calibration than the average brightness over the period of the subsequent scan, the calibration produces too high an estimate of the gain used to normalize the values of the scan and therefore the image, once the calibration is applied, will be brighter than it should be. The difference between the reported image brightness and the asymptotic value is an estimate of the increase in brightness of the lamp between the calibration and scan. As the lamp warms up, this difference decreases, and the lamp state during calibration becomes more representative of the state during scanning.

The fit shown in the graph 40 assumes an exponential approach to the asymptote, which is a function of the effect being caused by a physical change in temperature. That is, as time progresses, temperature approaches equilibrium, and the rate of change is proportional to the temperature difference between the current temperature and the equilibrium temperature. Given three points, the shape of such a curve is computed, and optionally quantized.

The above example is illustrative of error that results when the subject systems and methods are not employed. Early on, the difference between the sensed value and the value that would have been sensed had the lamp been fully warm is larger; as the lamp warms up, this difference drops. The difference approaches zero according to an exponential function; if that difference is modeled, a correction to the scanned result can be applied that eliminates that difference, yielding a calibrated scan that is a useful approximation to the calibrated scan that would have resulted had the scanner warmed up indefinitely.

The calibration function gives, at one instant, the correction required to make the scan as much like one that would have resulted had the scanner warmed up indefinitely. The graph 40 indicates that the error in the calibration function drops in an exponential fashion; therefore the calibration function itself must approach an asymptote in an exponential fashion. Accordingly, one highly useful approximation to the calibration function will result from measuring the calibration at a sufficient number of points to fit an exponential calibration function, in this case three points.

Another sufficient approximation is to use a linear model, where the rate of change is assumed to be constant throughout the period of the scan. Yet another approximation, which suffices for some purposes, is generated by assuming a constant, and averaging the values of the white calibration before and after the scan.

With respect to FIG. 2, it is anticipated that most of the scanning in a real product configuration is done close to the left end of the graph 40 (e.g., shortly after the light is turned on). Here, error is more pronounced, and the curvature of the best fit calibration function highest, but it is still much closer to linear than constant.

To summarize the method, at least two white calibration files are captured. In one specific embodiment, one white calibration file is captured before and another after the scan. In another embodiment, two white calibration files are captured before the scan, and optionally another is captured after the scan. In yet another embodiment, a single long-duration white calibration file is captured before the scan, and a shorter, regular-duration file is captured after the scan. In any case, the captured white calibration files include enough information to provide a desired level of a model (or function) of the scanner state as a function of time, and provide a temporally varying calibration.

In the $0^{th}$ order instance, the average of the two white files is used, to facilitate increased accuracy over using just one file. This method will cut the error in half, relative to the method of using only a calibration file taken before the scan. In the first order instance two or more files are used to generate a linear model or function, optionally using linear regression if more than two files are included. In the second order instance, at least three files are used to generate the parameters of an exponential decay function. In an automated system, if more than one page is being scanned, a single calibration file captured between scans can be used for both the page before and the page after. In a continuous stream of multiple pages, calibration files captured between pages can all be used to compute parameters of a calibration function; in this case a quality non-linear model becomes available. In this example, the first calibrated page can be delayed until after several pages have been scanned, when enough data has been captured to make the calibration function available.

Figure 3:
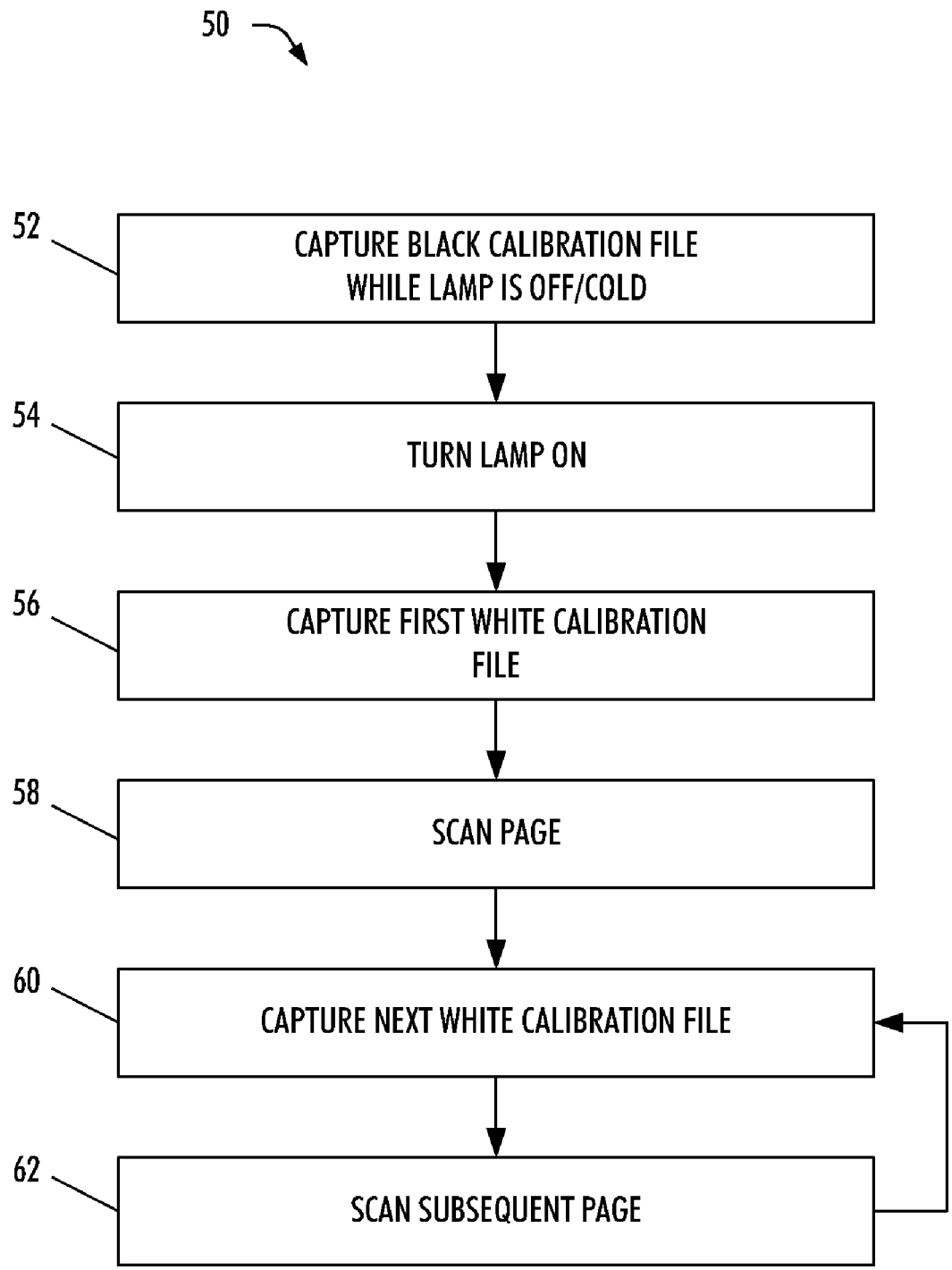
FIG. 3 is an illustration of a method for capturing a number of calibration files for generating a calibration function and/or modeling a scanner for calibration thereof, in accordance with various features described herein.
Figure 4:
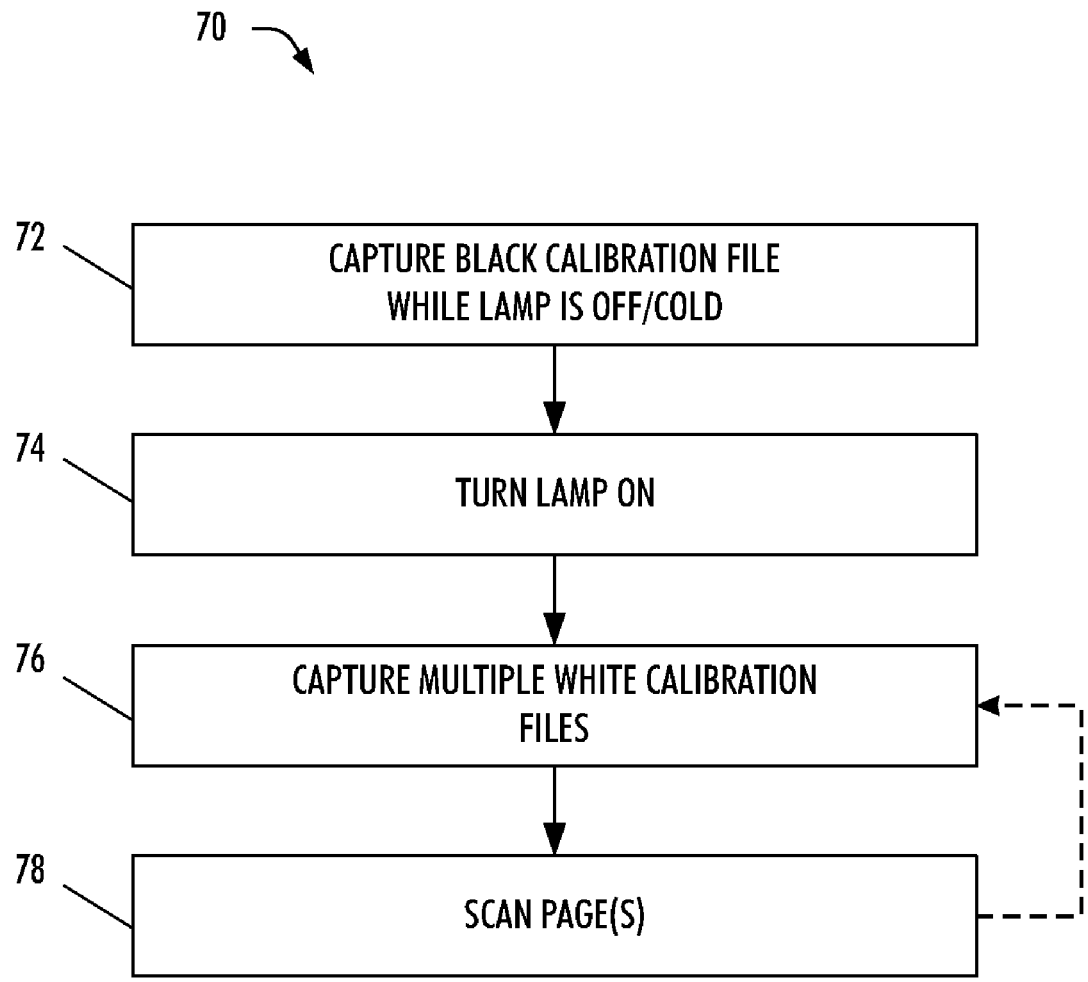
FIG. 4 is an illustration of another method of capturing a number of calibration files for generating a calibration function and/or modeling a scanner for calibration thereof, in accordance with various features described herein.
Figure 5:
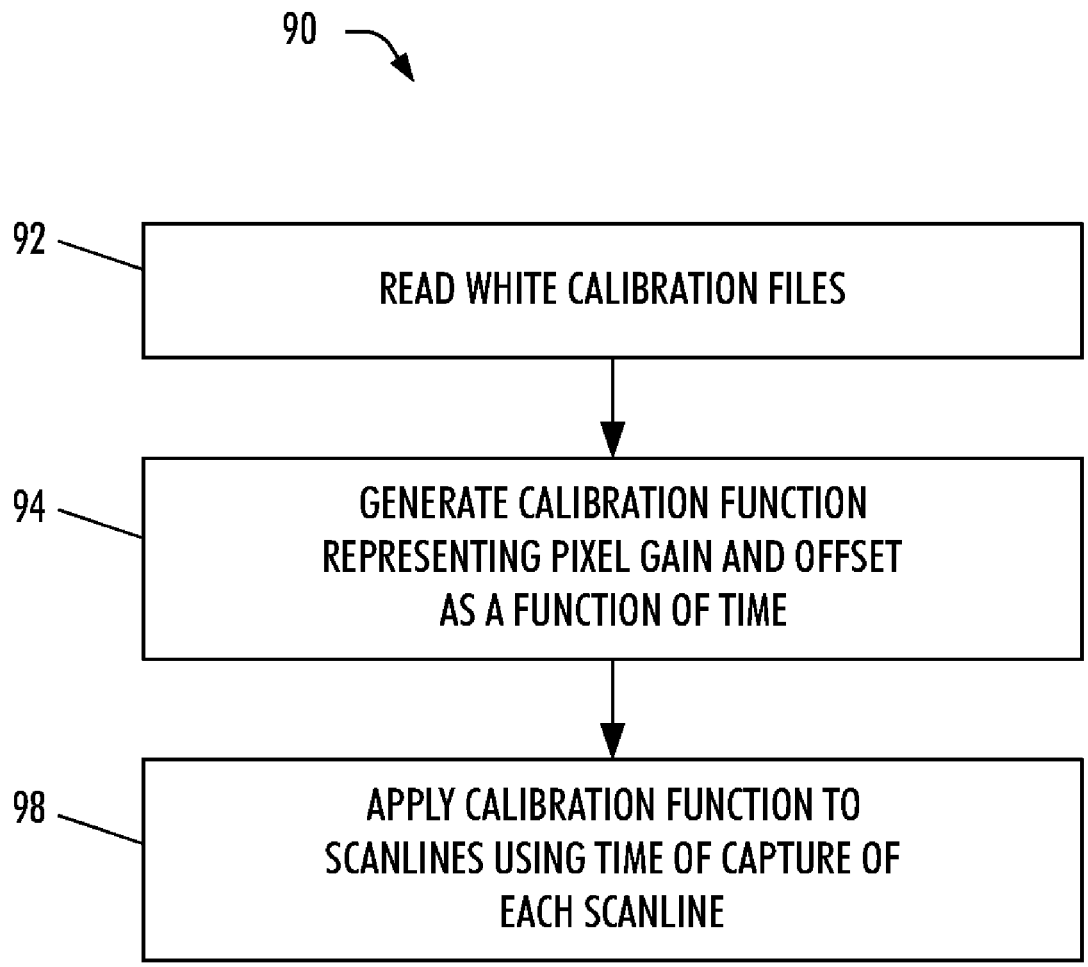
FIG. 5 illustrates a method of generating a model of the scanner in order to facilitate calibration thereof, in accordance with one or more features.

FIGS. 3-5 illustrate one or more methods related to scanner calibration, in accordance with various features described herein. While the methods are described as a series of acts, it will be understood that not all acts may be required to achieve the described goals and/or outcomes, and that some acts may, in accordance with certain aspects, be performed in an order different than the specific orders described.

FIG. 3 is an illustration of a method 50 for capturing a number of calibration files for generating a calibration function and/or modeling a scanner for calibration thereof, in accordance with various features described herein. At 52, a black calibration file is captured, with a scanner lamp off or otherwise not illuminating the sensor either directly or indirectly. For instance, the scanner lamp can be left off for a predetermined period to ensure that the lamp is cool and that no residual glow is present during the black scan. In one example, the scanner lamp is cooled by a heat dissipating means or apparatus, such as a fan, heat dissipating fins on the lamp housing, or the like. In another example the lamp housing is formed of a heat-dissipating material. In another example, the sensor is directed at a light-absorbing cavity.

At 54, the lamp is turned on and optionally allowed to warm up to substantially full brightness. At 56, a first white calibration file is captured. For instance, a scanner bar can be positioned near a substantially white calibration strip or surface, and an image or other data can be collected to generate the white calibration file. Once the first white calibration file is obtained, a page is scanned at 58. Upon completion of the page scan, a subsequent white calibration file is obtained, at 60, in a manner similar to the capture of the white calibration file at 56. Optionally, the method can revert from 60 back to 58, where a next page is scanned, and so on to iteratively capture white calibration files between multiple page scans.

FIG. 4 is an illustration of another method 70 of capturing a number of calibration files for generating a calibration function and/or modeling a scanner for calibration thereof, in accordance with various features described herein. At 72, a black calibration file is captured while a scanner lamp is off and cool. At 74, the lamp is turned on and optionally allowed to warm up to substantially full brightness. Multiple white calibration files are captured at 76. At 78, a page is scanned.

In one example, two or more white calibration files are captured, which are later employed to generate a model of the scanner (e.g., a 0-order, $1^{st}$-order, $2^{nd}$-order, etc.) for use in calibrating the scanner. The model can be a function that is applied to scanlines in each page scan, each scanline having a time stamp indicative of its time of capture. Each function includes information related to pixel gain and offset in the scanned page.

FIG. 5 illustrates a method 90 of generating a model of the scanner in order to facilitate calibration thereof, in accordance with one or more features. At 92, the white calibration files (e.g., captured before and/or after a scanned page) are read and information contained therein is analyzed. At 94, a calibration function (e.g., a scanner model) is generated, which represents pixel offset and gain as a function of time for pixels in a scanned page.

In one example, the calibration function averages values in the pre-scan and post-scan white calibration files (i.e., a 0-order function is generated). In another example, a $1^{st}$-order (i.e., linear) function describing pixel offset and gain as a function of time is generated using two white calibration files. Another example relates to generating a linear function using more than two white calibration files, which is performed using a linear regression technique. Still another example involves generating an exponential decay ($2^{nd}$-order) function that describes pixel gain and offset as a function of time, using at least three white calibration files. It will be appreciated that any desired level (e.g., $3^{rd}$-order, . . . , Nth-order) of calibration function or scanner model can be generated using an appropriate number of white calibration files, constrained only by the limitations of the hardware, software, etc., employed to carry out the described methods and computations, and the foregoing examples are not intended to be construed in a limiting sense.

At 96, the calibration function is applied to scanlines in the scanned page data file, using the time stamp of each scanline. According to one example, the capture time of each scanline is entered into the calibration function, and a resultant expected pixel gain and/or offset is output for one or more pixels in the scanline.

Figure 6:
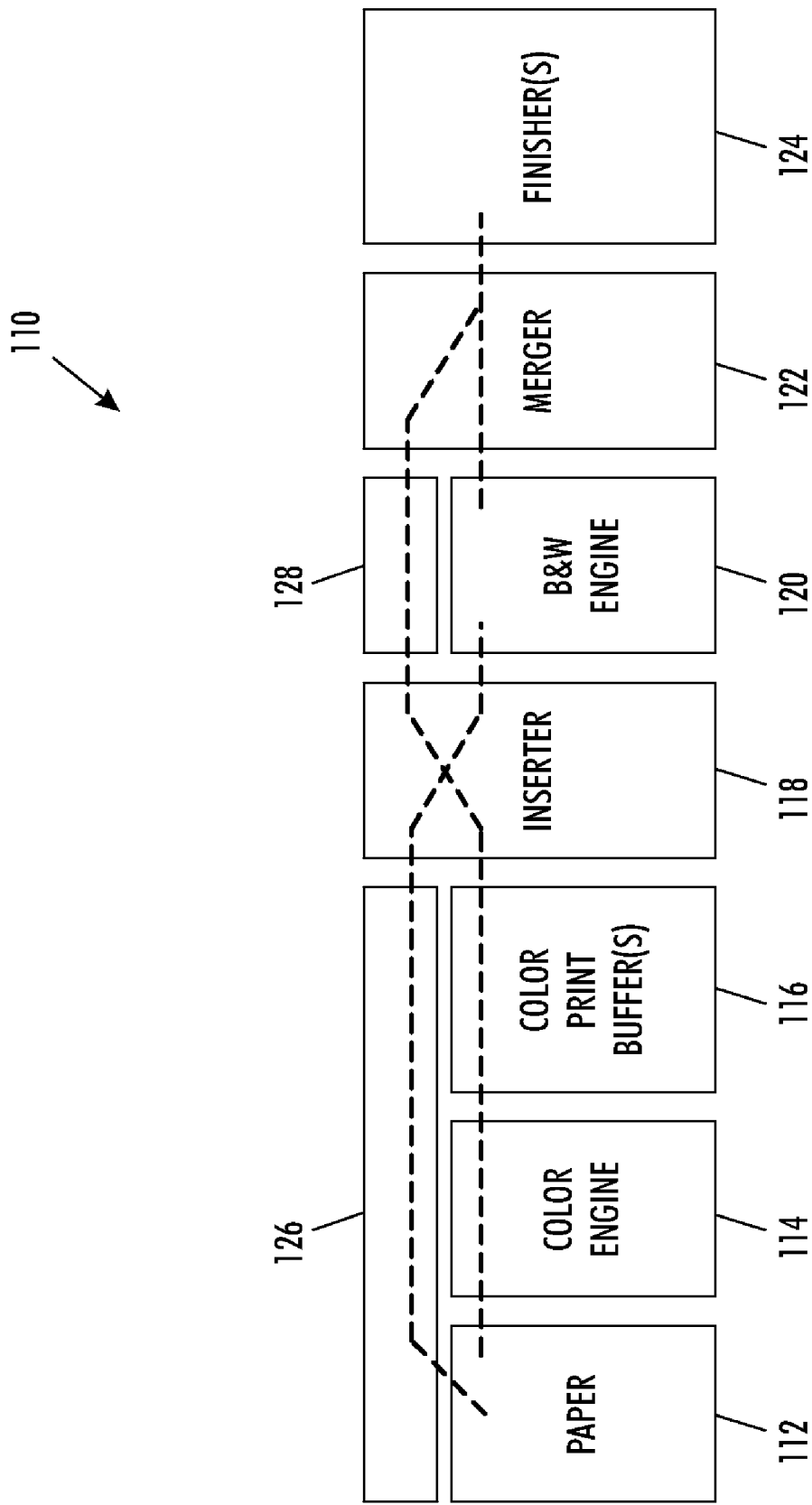
FIG. 6 illustrates a system comprising a plurality of components, such as may be employed in a universal production printer with a color print sheet buffer or a tightly-integrated parallel printer (TIPP) system, which represents an environment in which the various features described herein may be employed.

FIG. 6 illustrates a system 110 comprising a plurality of components, such as may be employed in a universal production printer with a color print sheet buffer or a tightly-integrated parallel printer (TIPP) system, which represents an environment in which the various features described herein may be employed. The system 110 comprises a paper source 112, which may comprise one or more sheets of paper, and which is operatively associated with a color print engine 114 and an inserter 118. Paper from the paper source 112 may follow one of two paths. For instance, paper may be routed from the paper source 112 to the color print engine 114, and on to a color print buffer 116, before entering the inserter 118. Additionally or alternatively, paper may be routed directly from the paper source 112 to the inserter 118 (e.g., bypassing the color engine 114 and the color print buffer 116 using the highway path 126). Similarly, paper may bypass the black and white engine 120 using the highway path 128.

Paper that has been routed directly from the paper source 112 to the inserter 118 may be passed to a black-and-white print engine 120, then through a merger 122 that merges black-and-white and color pages, before proceeding on to a finisher 124 that finishes the document for presentation to a user. It will be appreciated that according to other examples, a page may pass through all components of the system 110 and may have both color portions and black-and-white portions. The actions associated with a job performed by system 110 may be organized into a series of events that define one or more solutions, or "plans," to the job. Alternatively, the second print engine 120 can be a color print engine. Pages in a single document may be printed on at least two color print engines, and a scan bar may be used to measure the resulting colors, enabling the two color print engines to be consistently calibrated to a common standard.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A method of calibrating a scanner, comprising:
capturing a black calibration file;
positioning a scan bar near a substantially uniform white calibration strip;
capturing a first white calibration file while a scanner lamp is on;
capturing a second white calibration file;

computing gain and offset values using the black calibration file, the first white calibration file and the second white calibration file;

capturing a third white calibration file; and generating an exponential decay function from at least three white calibration files, wherein the exponential decay function describes pixel gain and offset as a function of time.

2. The method of claim 1, wherein capturing the black calibration file is done while the scanner lamp is off.

3. The method of claim 1, wherein capturing the black calibration file is done while at least one of the lamp or the scan bar is positioned near a substantially non-reflective object.

4. The method of claim 1, further comprising capturing a second black calibration file after a page is scanned.

5. The method of claim 1, further comprising capturing the second white calibration file after scanning a page.

6. The method of claim 1, further comprising generating an average value from the first and second white calibration files and calibrating the scanner to the average white value.

7. The method of claim 1, further comprising performing a linear regression technique to generate a linear function that describes pixel gain and offset as a function of time.

8. The method of claim 7, further comprising applying the linear function to a scanline according to a time of capture of the scanline.

9. The method of claim 1, wherein the third and subsequent white calibration files are iteratively captured subsequent white calibration files after each of a plurality of pages is scanned.

10. The method of claim 1, further comprising capturing the second white calibration file before the page is scanned, and capturing at least a third white calibration file after the page is scanned.

11. The method of claim 1, further comprising applying the exponential decay function to a scanline according to a time of capture of the scanline.

12. The method of claim 1, further comprising capturing the second white calibration file before scanning the page, and generating at least one of an average value or a linear function that describes pixel gain and offset in the scanned page, using the two white calibration files.

13. The method of claim 1, further comprising capturing multiple white calibration files prior to scanning a first page, calibrating the scanner using the multiple white calibration files, and scanning multiple pages after calibrating the scanner.

14. A scanner calibration system, comprising:

a scanner with a lamp, a calibration strip, and a scan bar;

a calibration file capture component that captures a black calibration file, and captures at least a first white calibration file and a second white calibration file when the lamp is on;

a gain and offset processor that computes gain and offset values using data from one or more captured white calibration files and the black calibration file; and a function generator that generates a function representing the gain and offset values, using the captured calibration files;

wherein the calibration file capture component captures at least a third white calibration file, and the function representing pixel gain and offset information is at least one of a linear function generated from the first, second, and third white calibration files using linear regression, or an exponential decay function generated from the first, second, and third white calibration files.

15. The system of claim 14, wherein the black calibration file is captured at least one of while the lamp is off or the scan bar is positioned near a substantially non-reflective object.

16. The system of claim 14, wherein the calibration file capture component captures a first white calibration file when the lamp is turned on and warmed up, and wherein the scanner scans a page after the first white calibration file is captured.

17. The system of claim 16, wherein the calibration file capture component captures a second white calibration file after the scanner scans the page.

18. The system of claim 17, wherein the function representing pixel gain and offset information is at least one of an average of values from the first and second white calibration files, or a linear function generated from the first and second white calibration files.

19. The system of claim 14, wherein the scanner applies the function to calibrate a scanned page.

* * * * *